US007292878B2

(12) United States Patent
Noguchi et al.

(10) Patent No.: US 7,292,878 B2
(45) Date of Patent: Nov. 6, 2007

(54) RADIO MOBILE TERMINAL COMMUNICATION SYSTEM

(75) Inventors: Jun Noguchi, Tokyo (JP); Hiroshi Hagane, Tokyo (JP)

(73) Assignee: NEC Corporation, Tokyo (JP)

( * ) Notice: Subject to any disclaimer, the term of this patent is extended or adjusted under 35 U.S.C. 154(b) by 694 days.

(21) Appl. No.: 10/450,912

(22) PCT Filed: Dec. 18, 2001

(86) PCT No.: PCT/JP01/11094

§ 371 (c)(1),
(2), (4) Date: Jun. 19, 2003

(87) PCT Pub. No.: WO02/052831

PCT Pub. Date: Jul. 4, 2002

(65) Prior Publication Data

US 2004/0053646 A1    Mar. 18, 2004

(30) Foreign Application Priority Data

Dec. 22, 2000    (JP)    ............................. 2000-390527

(51) Int. Cl.
*H04B 1/38*     (2006.01)
*H04M 1/00*    (2006.01)

(52) U.S. Cl. ................... 455/563; 704/9; 704/257; 704/275

(58) Field of Classification Search ................ 455/563; 379/90.01, 90.02; 704/9, 257, 275
See application file for complete search history.

(56) References Cited

U.S. PATENT DOCUMENTS 6,240,448 B1 * 5/2001 Imielinski et al. .......... 709/218

FOREIGN PATENT DOCUMENTS

| JP | 10-240638 A | 9/1998 |
|---|---|---|
| JP | 2000-137596 A | 5/2000 |

(Continued)

OTHER PUBLICATIONS

S. H. Maes, et al.; "Multi-Modal Interaction in the Age of Information Appliances"; Multimedia and Expo, 2000; 2000 IEEE International Conference; New York, NY, USA; Jul. 30-Aug. 2, 2000; vol. 1; pp. 15-18.

*Primary Examiner*—Duc M. Nguyen
*Assistant Examiner*—My X Nguyen
(74) *Attorney, Agent, or Firm*—Sughrue Mion Pllc.

(57) ABSTRACT

In this radio portable terminal communication system, a service document file is converted into a window-related document file, speech-dialog-related document file, and information sharing document file. A description of a telephone number for speech communication with a center is added to the window-related document file. The window-related document file is output to a place where the file can be used through packet communication. The speech-dialog-related document file is output to a place where the file can be referred to by a speech dialog control section (207). The information sharing document file is output to an information management section (204). The information management section (204) manages information in accordance with the general-purpose description language contents of the information sharing document file such that information can be shared between the window-related document file and the speech-dialog-related document file. Since information about windows and speech dialog is created by using a general-purpose description language in this system, the number of steps in development can be reduced.

11 Claims, 4 Drawing Sheets

FOREIGN PATENT DOCUMENTS

| | | |
|---|---|---|
| JP | 2001-042984 A | 2/2001 |
| JP | 2001-202363 A | 7/2001 |
| JP | 2001-352398 A | 12/2001 |
| JP | 2002-033843 A | 1/2002 |
| WO | WO 92/17838 A1 | 10/1992 |
| WO | WO 00/21232 A2 | 4/2000 |

* cited by examiner

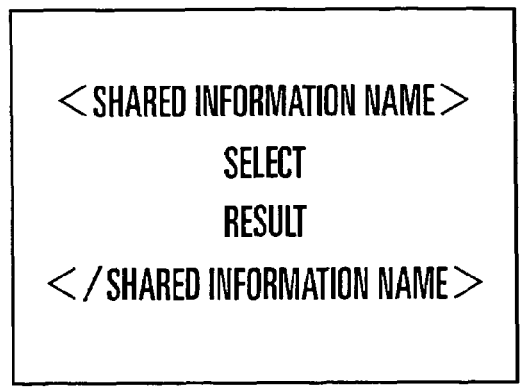

```
<SHARED INFORMATION NAME>
    SELECT
    RESULT
</SHARED INFORMATION NAME>
```

FIG. 4

```
<SERVICE DOCUMENT>
    <WINDOW-RELATED DOCUMENT>
        DOCUMENT (1) DESCRIBED IN C-HTML
    </WINDOW-RELATED DOCUMENT>
    <WINDOW-RELATED DOCUMENT>
        DOCUMENT (2) DESCRIBED IN C-HTML
    </WINDOW-RELATED DOCUMENT>
        ⋮
    <SPEECH-DIALOG-RELATED DOCUMENT>
        DOCUMENT (1) DESCRIBED IN VoiceXMLI
    </SPEECH-DIALOG-RELATED DOCUMENT>
    <SPEECH-DIALOG-RELATED DOCUMENT>
        DOCUMENT (2) DESCRIBED IN VoiceXMLI
    </SPEECH-DIALOG-RELATED DOCUMENT>
        ⋮
    <SHARED INFORMATION NAME>
        SELECT
        RESULT
    </SHARED INFORMATION NAME>
</SERVICE DOCUMENT>
```

FIG. 5

RADIO MOBILE TERMINAL COMMUNICATION SYSTEM

TECHNICAL FIELD

The present invention relates to a radio portable terminal communication system and, more particularly, to a radio portable terminal communication system which can easily provide services such as an information search service by using speech communication and packet communication with a radio portable terminal, and can easily develop services to be provided.

BACKGROUND ART

Conventionally, when an information search is to be made by using packet communication with a radio portable terminal such as a cell phone, a search word is selected from search items displayed on the screen of the cell phone with the cursor or a search word is input as characters by operating keys on the cell phone, and the search word is transmitted in the form of a packet to an information source (contents provider). The information source then packets information found with the search word and sends back it to the cell phone, thereby displaying the information on the screen of the cell phone.

In the method of selecting a search word with the cursor in this manner, if there are many search words, they cannot be displayed on the screen of the cell phone at once. For this reason, a user selects a search word while switching windows. It, however, takes much time to reach a target search word. In addition, in the method of inputting a search word as characters by operating key buttons on the cell phone, since the keys on the cell phone are small, and multiple-character keys are used, cumbersome, time-consuming operation is required.

Information searches using speech communication with a cell phone are also available. In this case, an uttered search word is subjected to speech recognition, and information is found from an information source with the search word. This information is then converted into speech and sent back to the cell phone.

In such search by speech recognition using speech communication, although a search word can be input by speech with a cell phone, a search result is not left as a record because it is sent back by speech. In addition, image information cannot be sent back to the cell phone.

DISCLOSURE OF INVENTION

It is an object of the present invention to provide a radio portable terminal communication system which can improve the operability of a radio portable terminal by facilitating the exchange of information search words and data by using a speech communication function and packet communication function, and allows a search result to be checked in any of the forms of speech, images, and characters.

It is another object of the present invention to provide a radio portable terminal communication system which can facilitate the construction of a service using the above radio portable terminal communication system.

It is still another object of the present invention to provide a radio portable terminal communication system which can facilitate the exchange of data between a description language related to radio portable terminal windows and a speech-dialog-related description language in a service using the above radio portable terminal communication system.

It is still another object of the present invention to provide a radio portable terminal communication system which facilitate the management of telephone numbers used for speech communication for speech recognition on the center side in a service using the above radio portable terminal communication system.

In order to achieve the above objects, a first radio portable terminal communication system of the present invention is characterized by comprising a radio portable terminal having a speech communication function and a packet communication function, and a center linking the radio portable terminal, the center including a speech recognition section which recognizes a speech signal from the radio portable terminal, an information search section which searches for information in accordance with an input search word, a speech dialog control section which controls the speech recognition section, the information search section, and the speech conversion section to perform a speech dialog when speech communication is made upon dialing from the radio portable terminal, a document file input section which inputs a service document file used for a service provided for the radio portable terminal, which is created by making a description about at least window display, used in the packet communication, in a general-purpose radio portable terminal window description language, a description about operation of the speech dialog control section, used in the speech communication, in a general-purpose speech-dialog-related description language, and a description about exchange of information between the packet communication and the speech communication in a dedicated language, an information management section which manages information such that the information can be shared between the packet communication and the speech communication, a document file conversion section which performs conversion processing for the service document file to create a window-related document file for the radio portable terminal in which a description is made about at least window display used in the packet communication, a speech-dialog-related document file in which a description is made about operation of the speech dialog control section which is used in the speech communication, and an information sharing document file in which a description is made about exchange of information between the packet communication and the speech communication, a document file output section which outputs the window-related document file to a place where the file can be referred to by the radio portable terminal through packet communication, outputs the speech-dialog-related document file to a place where the file can be referred to by the speech dialog control section, and outputs the information sharing document file to the information management section; and a packet control section which transmits/receives information of the information management section to/from the radio portable terminal through packet communication.

In addition, a second radio portable terminal communication system according to the present invention performs document conversion, upon reception of a service document file in which a description is made about at least window display, used in packet communication, in a general-purpose radio portable terminal window description language, a description is made about the speech dialog in the speech communication in a general-purpose speech-dialog-related description language, and a description is made about exchange of information between the packet communication and the speech communication in a dedicated language, outputs a window-related document file for a radio portable terminal, a speech-dialog-related document file, and an information sharing document file respectively to places where the files can be used, and exchanges information in packet communication and speech communication, as needed, when providing a service.

Furthermore, in a radio portable terminal communication method according to the present invention, document conversion is performed, upon reception of a service document file in which a description is made about at least window display, used in packet communication, in a general-purpose radio portable terminal window description language, a description is made about the speech dialog in the speech communication in a general-purpose speech-dialog-related description language, and a description is made about exchange of information between the packet communication and the speech communication in a dedicated language, a window-related document file for a radio portable terminal, a speech-dialog-related document file, and an information sharing document file are output respectively to places where the files can be used, and information is exchanged in packet communication and speech communication, as needed, when a service is provided.

BRIEF DESCRIPTION OF DRAWINGS

FIG. 4 is a view showing a specific example of an information sharing document file in an embodiment of the present invention; and FIG. 5 is a view showing a specific example of a service document file in an embodiment of the present invention.

BEST MODE OF CARRYING OUT THE INVENTION

The present invention will be described in detail below with reference to the accompanying drawings.

Figure 1:
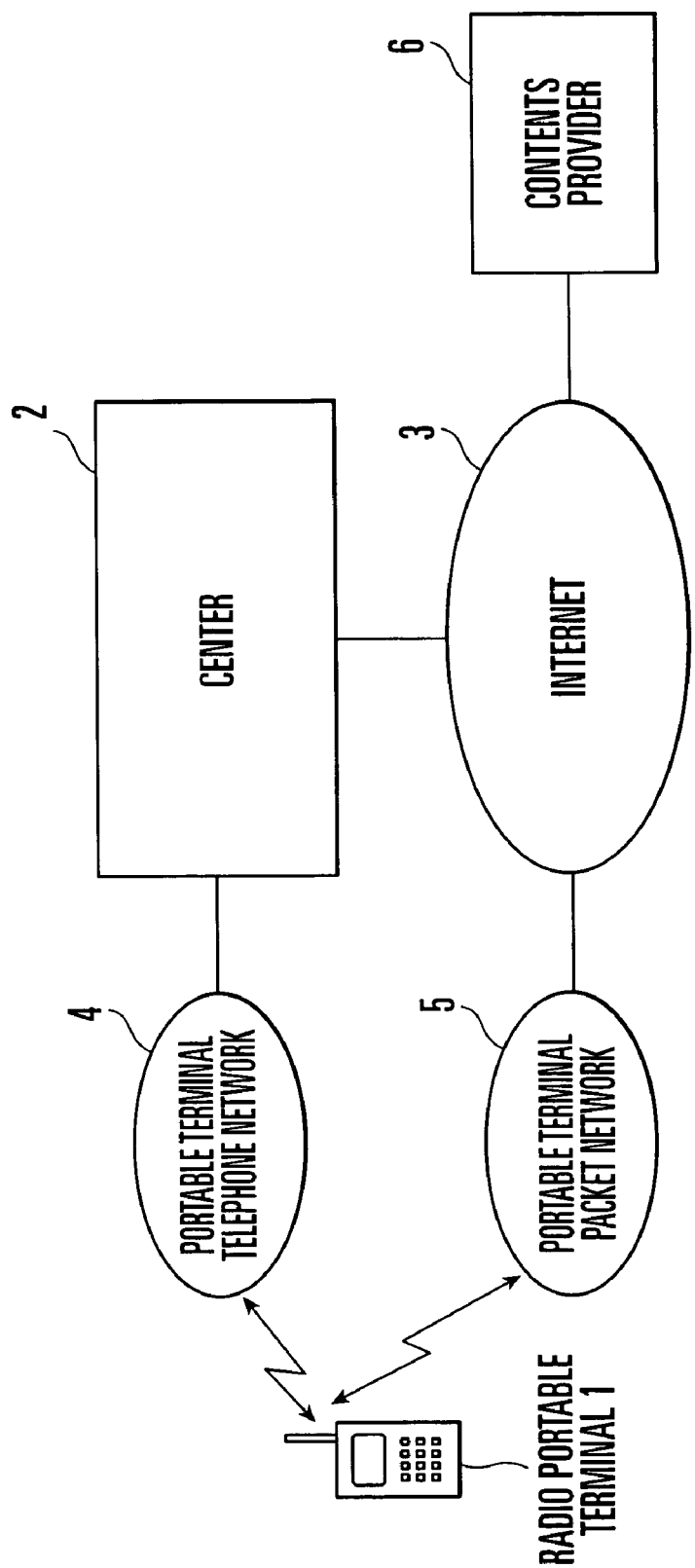
FIG. 1 is a schematic view showing an example of the overall arrangement of a radio portable terminal communication system according to the present invention.

As shown in FIG. 1, a radio portable terminal communication system according to the present invention is comprised of a radio portable terminal 1 such as a cell phone, center 2, Internet 3, portable terminal telephone network 4, portable terminal packet network 5, and contents provider (information source) 6.

Referring to FIG. 1, when the operator of the radio portable terminal 1 is to input information search words or data during the execution of packet communication by the terminal 1, he/she utters them and sends the uttered speech to the center 2 through the portable terminal telephone network 4.

The center 2 recognizes the sent speech and searches the information files in the contents provider 6 in accordance with the recognition result through the Internet 3. Found information and the like are converted into speech. The speech is then sent to the radio portable terminal 1 through the portable terminal telephone network 4 and displayed on the screen of the radio portable terminal 1.

The operator of the radio portable terminal 1 accesses a window-related document file (e.g., i-mode-compatible HTML (to be referred to as C-HTML hereinafter) used in the i-mode) created by the center 2 from the terminal 1 through the Internet 3, makes a selection on the window, and displays the input result obtained by a speech dialog, as in the i-mode provided by NTT DoCoMo.

In addition, the radio portable terminal 1 exchanges window-related information (e.g., terminal window selection result information), in addition to speech-dialog-related information, through the portable terminal telephone network 4.

An embodiment of the radio portable terminal communication system according to the present invention will be described in more detail next with reference to FIGS. 2 and 3.

Figure 2:
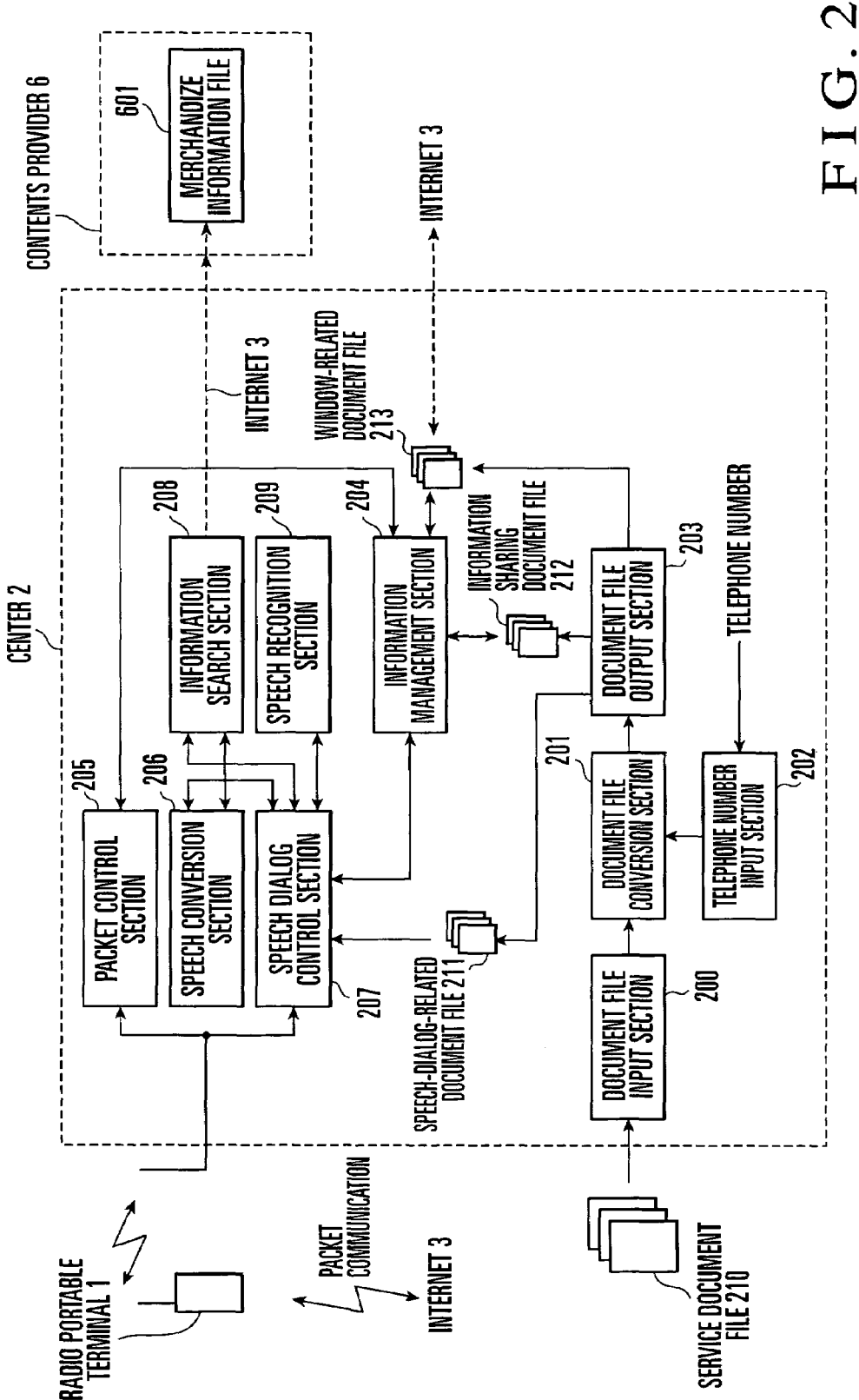
FIG. 2 is a block diagram showing a more specific example of the arrangement of the radio portable terminal communication system according to the present invention.

Referring to FIG. 2, the center 2 serves as, for example, a provider for providing services, and is comprised of a document file input section 200, document file conversion section 201, telephone number input section 202, document file output section 203, information management section 204, packet control section 205, speech conversion section 206, speech dialog control section 207, information search section 208, speech recognition section 209, speech-dialog-related document file 211, information sharing document file 212, and window-related document file 213.

A service document file 210 is input to the document file input section 200.

The radio portable terminal 1 is used by a user to use services, and has a speech communication function and packet communication function. For example, as shown in FIG. 3, the radio portable terminal 1 includes a switch 101 for switching from the packet communication mode to the speech communication mode, a switch 102 for switching from the speech communication mode to the packet communication mode, a speaker 111, a screen 112 such as a liquid crystal screen, a microphone 113, and a key operating section 114.

The contents provider 6 includes a merchandise information file 601 storing merchandise information used for services, and the like.

In this system, for services provided to the radio portable terminal 1, the service document file 210 is created by making a description about window display or operation, used in the packet communication mode, using a general-purpose radio portable terminal window description language (e.g., C-HTML), a description about a speech dialog in the speech communication mode by using a general-purpose speech-dialog-related description language (e.g., VoiceXML developed by VoiceXML Forum founded by AT&T, IBM, Lucent Technologies, and Motorola), and a description about the exchange of information between the packet communication mode and the speech communication mode by using a dedicated language, and the created service document file 210 is input to the document file input section 200.

The document file input section 200 sends the input service document file 210 to the document file conversion section 201.

The document file conversion section 201 converts the service document file 210 into the speech-dialog-related document file 211, information sharing document file 212, and window-related document file 213. The document file conversion section 201 also adds a description about a telephone number for speech communication with the center 2, which is sent from the telephone number input section 202, to the window-related document file 213, and outputs each document to the document file output section 203.

The telephone number input section 202 sends the input telephone number to the document file conversion section 201.

The document file output section 203 outputs the respective input documents. More specifically, the document file output section 203 outputs the speech-dialog-related document file 211 to the speech dialog control section 207, outputs the information sharing document file 212 to the information management section 204, and outputs the window-related document file 213 to the radio portable terminal 1 through the Internet 3 and portable terminal packet network 5.

The information management section 204 manages information in accordance with the contents described in the information sharing document file 212 such that information can be shared between the window-related document file 213 and the speech-dialog-related document file 211.

The packet control section 205 transmits/receives a description about the exchange of information with the information management section 204 to/from the radio portable terminal 1 through the portable terminal packet network 5, as needed.

The speech conversion section 206 converts information which can be converted into speech, of the information found by the information search section 208, into a speech signal and outputs it to the speech dialog control section 207.

The speech dialog control section 207 performs a speech dialog by controlling the speech recognition section 209, information search section 208, and speech conversion section 206 in accordance with the contents described in the speech-dialog-related document file 211, and exchanges information with the information management section 204, as needed.

The information search section 208 searches for information corresponding to input speech information, as needed, under the control of the speech dialog control section 207.

The speech recognition section 209 performs speech recognition processing under the control of the speech dialog control section 207.

As described above, the service document file 210 is a document file created for services to the radio portable terminal 1 by making a description about window display or operation, used in the packet communication mode, using a general-purpose radio portable terminal window description language, a description about a speech dialog in the speech communication mode by using a general-purpose speech-dialog-related description language, and a description about the exchange of information between the packet communication mode and the speech communication mode by using a dedicated language.

The speech-dialog-related document file 211 is output from the document file output section 203 to a place where the speech dialog control section 207 can refer to the file. The information sharing document file 212 is output from the document file output section 203 to the information management section 204. The window-related document file 213 is output to a place where it can be used by the radio portable terminal 1 through the portable terminal packet network 5 and Internet 3.

The merchandize information file 601 is set in the contents provider 6 to store merchandise information used for services.

An example of the operation of the embodiment of the present invention will be described below by exemplifying a service in which when "please input merchandise name: (1) foods, (2) sundries" is displayed on the screen 112 (FIG. 3) of the portable terminal during packet communication by the radio portable terminal 1, and the user selects one of the keys "foods" and "sundries" on the key operating section 114, information corresponding to a recognition result on the merchandise name which is input as speech by the user with the microphone 113 by using speech communication through the telephone network 4 is found from the merchandise information file 601 of the contents provider 6 through Internet 3, and the user is notified of the search result by speech or display on the screen.

Assume that a service constructor creates the service document file 210 for this service in advance by describing, for example, information related to a radio portable terminal window in C-HTML and speech-dialog-related information in VoiceXML.

Assume also that an information sharing document like the one shown in FIG. 4 is prepared as an example of the document described in a dedicated language concerning the exchange of information between two documents. In the information sharing document in this embodiment, the variables whose names are described between <shared information name> and </shared information name> are shared between the two documents. In this case, variables SELECT and RESULT are shared. In this case, variable SELECT is used to share a recognition result selected at a specific point during the execution of the window-related document file 213 for the radio portable terminal 1 by packet communication through the Internet 3 and portable terminal packet network 5, and variable RESULT is used to share a recognition result at the time of a speech dialog through the telephone network 4. An example of the method of realizing such sharing of variables SELECT and RESULT is a method in which the information management section 204 has a file in which the values of these variables are described, a write or reference is allowed with respect to this file during both the execution of packet communication and a speech dialog, and a write or reference is made with respect to the values of the variables in the file, as needed.

FIG. 5 shows an example of a service document file 310 for this service. In the case shown in FIG. 5, all documents are described between <service document> and </service document>; each window-related document, between <window-related document> and </window-related document>; each speech-dialog-related document, between <speech-dialog-related document> and </speech-dialog-related document>; and information sharing document, between <shared information name> and </shared information name>.

The above service document file 210 is input to the document file input section 200 and output to the document file conversion section 201. The document file conversion section 201 extracts each document described between <window-related document> and </window-related document> in the service document file 210 to create the window-related document file 213, and adds a description about a telephone number for speech communication with the center 2, which is sent from the telephone number input section 202, to the file. The following is an example of the method of adding a description about a telephone number. In general, according to the description method in the case of speech communication in C-HTML, for example, a telephone number is described as follows by using the PHONE-TO function:

<a href=tel:0333080○x∆□>merchandize search</a> ("0333080○x∆□" is the telephone number for speech communication.)

In a window-related description in the service document file, at a portion where the PHONE-TO function is used, a blank field is set in advance as a telephone number field as follows:

<a href=tel:>merchandize search</a>

When a description about a telephone number is to be added, a search is made for the character string "<a href=tel:>" in the window-related description in the service document file, and the telephone number sent from the telephone number input section 202 is inserted between "tel:" and ">".

The document file conversion section 201 extracts each document described between <speech-dialog-related document> and </speech-dialog-related document> in the service document file 210 to create the speech-dialog-related document file 211. The service document file 210 also extracts each document described between <shared information name> and </shared information name> in the service document file 210 to create the information sharing document file 212. The document file conversion section 201 outputs the window-related document file 213, speech-dialog-related document file 211, and information sharing document file 212, which are the conversion results on the input service document file, to the document file output section 203.

The document file output section 203 outputs the respective documents input from the document file conversion section 201 as follows. The window-related document file 213 is output to a place where the file can be used by the radio portable terminal 1 through packet communication (e.g., a place where the document can be displayed when its URL is designated by using the radio portable terminal 1). The speech-dialog-related document file 211 is output to a place where the speech dialog control section 207 can refer to the file (e.g., a directory in a speech recognition unit which performs speech recognition processing). The information sharing document file 212 is output to the information management section 204.

The user displays a window on the radio portable terminal 1 by performing packet communication with the radio portable terminal 1 through the Internet 3 and portable terminal packet network 5 and using the window-related document file 213. Assume that after "please input merchandise name: (1) foods, (2) sundries" is displayed on the screen 112 of the radio portable terminal 1, the user has selected "foods". In this case, the selection result is sent as a description in the window-related document file 213 to the information management section 204 by packet communication, and is set to SELECT of the shared information names. Another method of sending the result selected on the screen to the center 2 side may be an implementation method of writing the result in a file that can be referred to by the information management section 204, e.g., a file on the Internet, in accordance with the description in the window-related document file 213 by using a CGI (COMPUTER GRAPHIC INTERFACE) or the like.

Figure 3:
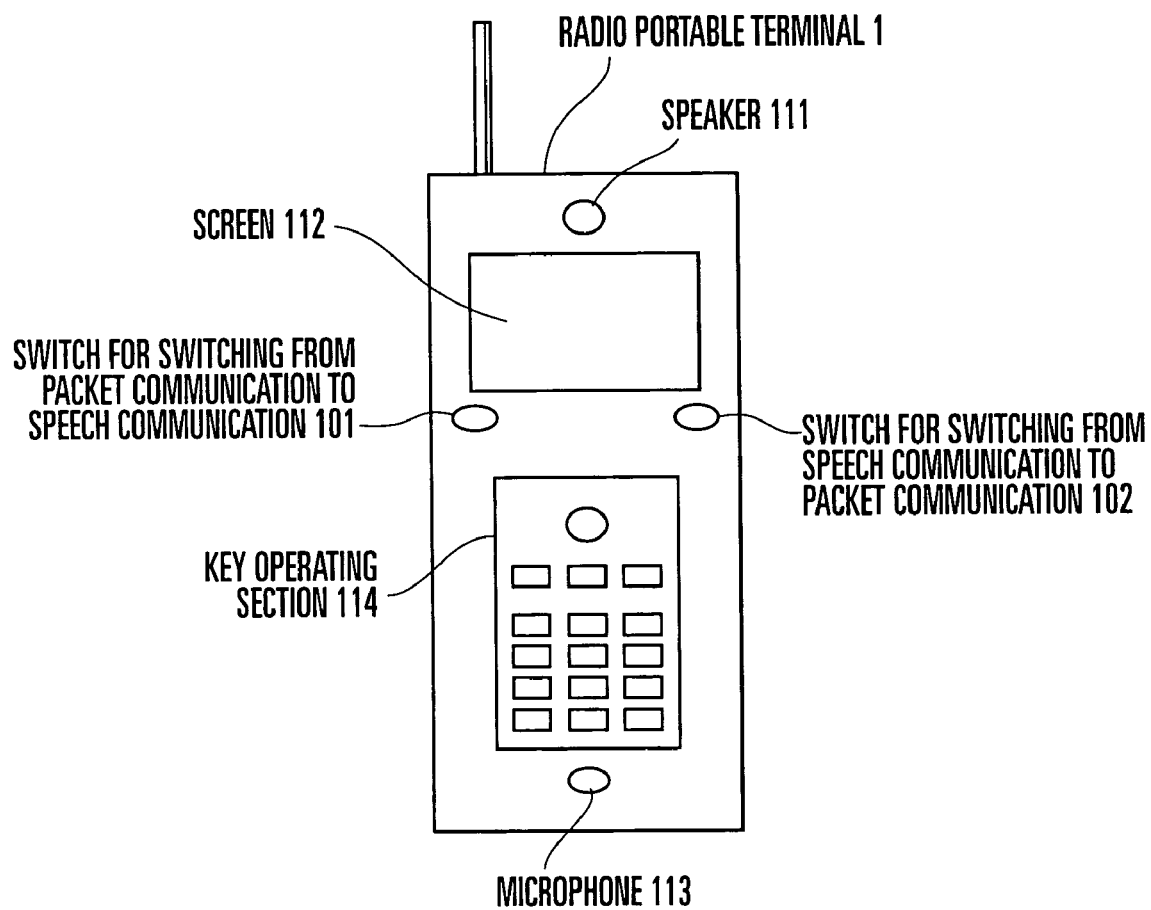
FIG. 3 is a schematic view showing an example of the outer appearance of a radio portable terminal in the radio portable terminal communication system according to the present invention.

Upon execution of the above selection, the user performs speech communication with the center 1 through the telephone network 4 by dialing using, for example, the PHONE-TO function(pressing the switch 101 for switching from the packet communication mode to the speech communication mode in FIG. 3) in accordance with the contents described in the window-related document file 213. Since "foods" is set to shared information name SELECT in the information management section 204, the speech dialog control section 207 executes a dialog for a search with respect to merchandise name "foods" (executing a dialog for a search with respect to merchandise "sundries" if "sundries" is selected) in accordance with the contents described in the speech-dialog-related document file 211. If the user utters "Chinese noodles" to the microphone 113 of the radio portable terminal 1, the input speech is sent to the speech dialog control section 207 by speech communication. The speech dialog control section 207 sends this speech to the speech recognition section 209. The speech recognition section 209 recognizes the speech and sends the recognition result "Chinese noodles" to the speech dialog control section 207. The speech dialog control section 207 sends the recognition result "Chinese noodles" to the information management section 204 and information search section 208.

The information search section 208 searches the merchandize information file 601 in the contents provider 6 for information about merchandize "Chinese noodles" through the Internet 3.

The information management section 204 sets the recognition result "Chinese noodles" to shared information name RESULT. The information search section 204 sends the information about merchandize "Chinese noodles" to the speech conversion section 206 to provide the user with the information by speech. The speech conversion section 206 converts the information into speech and sends it to the speech dialog control section 207. The speech dialog control section 207 transmits speech information about merchandize "Chinese noodles" to the radio portable terminal 1 by speech communication through the portable terminal telephone network 4, as needed, in accordance with the description in the speech-dialog-related document file 211. The radio portable terminal 1 outputs the received speech information about merchandize "Chinese noodles" from the speaker 111 to provide it for the user. In addition, in accordance with the contents described in the window-related document file 213, the speech recognition result set to shared information name RESULT in the information management section 204 is obtained by packet communication (pressing the switch 102 for switching from the speech communication mode to the packet communication mode) through the Internet 3 and portable terminal packet network 5, and the recognition result, corresponding information search result, and the like are displayed on the screen 112 of the radio portable terminal 1, as needed.

The above description has exemplified the case wherein the user operates the switches 101 and 102 to switch between the packet communication mode and the speech communication mode. However, a similar effect can also be obtained when the packet control section 205 or speech dialog control section 207 automatically switch the modes in accordance with the contents described in a document file or the like.

Assume that a broadband network is used as an infrastructure. In this case, the present invention can be practiced even under a situation in which packet communication and speech communication are simultaneously started, and are concurrently continued without switching between the packet communication mode and the speech communication mode on the way.

The following are the effects obtained by the present invention:

(1) Since the radio portable terminal communication system of the present invention flexibly performs, for example, exchange of information search words and data by using the speech communication function and packet communication function, the operability of the radio portable terminal can be improved, and search results can be checked in any of the forms of speech, images, and characters.

(2) For services for the radio portable terminal, information about window display and operation, used in the packet communication mode, is described in a general-purpose radio portable terminal window description language, and information about a speech dialog in the speech communication mode is described in a general-purpose speech-dialog-related description language. This greatly saves the user time and trouble in learning a new language, and hence reduces the number of steps in development.

(3) For services for the radio portable terminal, information about the exchange of information between the packet communication mode and the speech communication mode is described in a dedicated language instead of a general-purpose description language such as C-HTML or VoiceXML. This makes it possible to construct services without trouble and reduce the number of steps in development.

(4) Since the document file conversion section in the center has the function of adding, to a window-related document file, a description about a telephone number which is used when the radio portable terminal dials to perform speech communication, the service constructor need not describe a specific telephone number used for speech communication to be done for speech recognition on the center side. This makes it possible to reduce the number of steps in maintenance.

The invention claimed is:

1. A terminal communication system comprising a terminal having a speech communication function and a packet communication function, and a center linking said terminal, said center comprising:
   a speech recognition section which recognizes a speech signal indicating a search word from said terminal,
   an information search section which searches for information corresponding to the search word,
   a speech dialog control section which controls said speech recognition section and said information search section to perform a speech dialog when speech communication is made upon dialing from said terminal,
   a document file input section which inputs a service document file used for a service provided for said terminal, said service document file created by making a description about a window display, which is used in a packet communication, in a general-purpose terminal window description language; a description about operation of said speech dialog control section, which is used in the speech communication, in a general-purpose speech-dialog-related description language; and a description about an exchange between the packet communication and the speech communication in a dedicated language;
   an information management section which manages information such that the information can be shared between the packet communication and the speech communication;
   a document file conversion section which performs conversion processing with respect to the service document file to create a window-related document file for said terminal in which a description is made about a window display used in the packet communication, a speech-dialog-related document file in which a description is made about operation of said speech dialog control section which is used in the speech communication, and an information sharing document file in which a description is made about an exchange of information between the packet communication and the speech communication;
   a document file output section which outputs the window-related document file to a place where the file can be referred to by said terminal through packet communication, outputs the speech-dialog-related document file to a place where the file can be referred to by said speech dialog control section, and outputs the information sharing document file to said information management section; and
   a packet control section which transmits and receives information of said information management section to and from said terminal through packet communication.

2. A terminal communication system according to claim 1, characterized in that said document file conversion section of said center has a function of adding, to the window-related document file, a description of a telephone number used when dialing is made by said terminal to perform speech communication.

3. A terminal communication system according to claim 1, characterized in that said terminal is linked to at least said speech dialog control section of said center through a telephone network.

4. A terminal communication system according to claim 1, characterized in that said terminal includes a switch which switches from speech communication to packet communication, and a switch which switches from packet communication to speech communication.

5. A terminal communication system according to claim 1, characterized in that said information search section searches for information by accessing an information file of a contents provider through the Internet.

6. A terminal communication system according to claim 1, characterized in that said terminal includes a microphone, a speaker, a display screen, and a key operating section.

7. A terminal communication system according to claim 6, characterized in that said terminal includes a switch which switches from speech communication to packet communication, and a switch which switches from packet communication to speech communication.

8. A terminal communication system which performs document conversion, upon reception of a service document file in which a description is made about a window display, which is used in packet communication, in a general-purpose terminal window description language; a description is made about the speech dialog in a speech communication in a general-purpose speech-dialog-related description language; and a description is made about an exchange of information between the packet communication and the speech communication in a dedicated language; outputs a window-related document file for a terminal, a speech-dialog-related document file, and an information sharing document file respectively to places where the files can be used; and exchanges information in packet communication and speech communication, as needed, when providing a service.

9. A terminal communication method comprising:
   performing document conversion on a service document file, upon reception of the service document file, said service document file including a description about a window display, which is used in packet communication, in a general-purpose terminal window description language; a description about a speech dialog in a speech communication in a general-purpose speech-dialog-related description language; and a description about an exchange of information between the packet communication and the speech communication in a dedicated language, to produce a window-related document file for a terminal, a speech-dialog-related document file, and an information sharing document file;

outputting the window-related document file, the speech-dialog-related document file, and the information sharing document file, respectively, to places where the files can be used; and exchanging information in packet communication and speech communication, as needed, when a service is provided.

10. A center in a terminal communication system, which is constituted by a terminal having a speech communication function and a packet communication function, said center communicating with said terminal, said center comprising:

a speech recognition section which recognizes a speech signal from said terminal;

a speech conversion section which performs speech communication with said terminal;

an information search section which searches for information in accordance with a recognized search word;

a speech dialog control section which controls said speech recognition section, said information search section, and said speech conversion section to perform a speech dialog when speech communication is made with said terminal;

a document file input section which inputs a service document file used for a service provided for said terminal, said service document file created by making a description about a window display, which is used in a packet communication, in a general-purpose terminal window description language; a description about operation of said speech dialog control section, which is used in the speech communication, in a general-purpose speech-dialog-related description language; and a description about an exchange of information between the packet communication and the speech communication in a dedicated language, an information management section which manages information such that the information can be shared between the packet communication and the speech communication, a document file conversion section which performs conversion processing for the service document file to create a window-related document file for said terminal in which a description is made about a window display used in the packet communication, a speech-dialog-related document file in which a description is made about operation of said speech dialog control section which is used in the speech communication, and an information sharing document file in which a description is made about an exchange of information between the packet communication and the speech communication, a document file output section which outputs the window-related document file to a place where the file can be referred to by said terminal through packet communication, outputs the speech-dialog-related document file to a place where the file can be referred to by said speech dialog control section, and outputs the information sharing document file to said information management section; and a packet control section which transmits and receives information of said information management section to and from said terminal through packet communication.

11. A center in a terminal communication system according to claim 10, characterized in that said document file conversion section has a function of adding, to the window-related document file, a description of a telephone number used when dialing is made by said terminal to perform speech communication.

\* \* \* \* \*